United States Patent [19]
Luder

[11] 4,213,014
[45] Jul. 15, 1980

[54] HALF ECHO-SUPPRESSOR FOR A FOUR-WIRE TELEPHONE LINE

[75] Inventor: Jacques Luder, Ris Orangis, France

[73] Assignee: Societe Anonyme, Compagnie Industrielle des Telecommunications Cit-Alcatel, Paris, France

[21] Appl. No.: 944,282

[22] Filed: Sep. 21, 1978

[30] Foreign Application Priority Data

Oct. 3, 1977 [FR] France .............................. 77 29637

[51] Int. Cl.² ............................................. H04B 3/20
[52] U.S. Cl. ............................... 179/170.2; 179/170.6
[58] Field of Search ................ 179/170.2, 170.6, 170.8

[56] References Cited

U.S. PATENT DOCUMENTS

| | | | |
|---|---|---|---|
| 3,825,694 | 7/1974 | Penicaud | 179/1 SA |
| 3,896,273 | 7/1975 | Fariello | 179/170.2 |
| 3,906,172 | 9/1975 | Hoeschele, Jr. et al. | 179/170.6 |
| 3,937,907 | 2/1976 | Campanella et al. | 179/170.6 |
| 3,985,979 | 10/1976 | Durand et al. | 179/170.6 |
| 4,051,332 | 9/1977 | Izumi et al. | 179/170.2 |
| 4,088,851 | 5/1978 | Gupta et al. | 170/170.2 |

Primary Examiner—Bernard Konick
Assistant Examiner—Randall P. Myers
Attorney, Agent, or Firm—Roland Plottel

[57] ABSTRACT

The invention comes within the field of half echo-suppressor for four-wire telephone lines and relates more particularly to the transmitted speech detector, said suppressor comprising an accumulator for accumulating characteristic indices of the samples, to control of the blocking element in the send channel depending on the accumulated value.

In accordance with the invention, there is provided at least one digital comparator with a threshold, which receives the content of the accumulator and whose threshold is fixed between the limits of the accumulator. The blocking element can therefore be controlled with several operation times and via different hold circuits.

4 Claims, 4 Drawing Figures

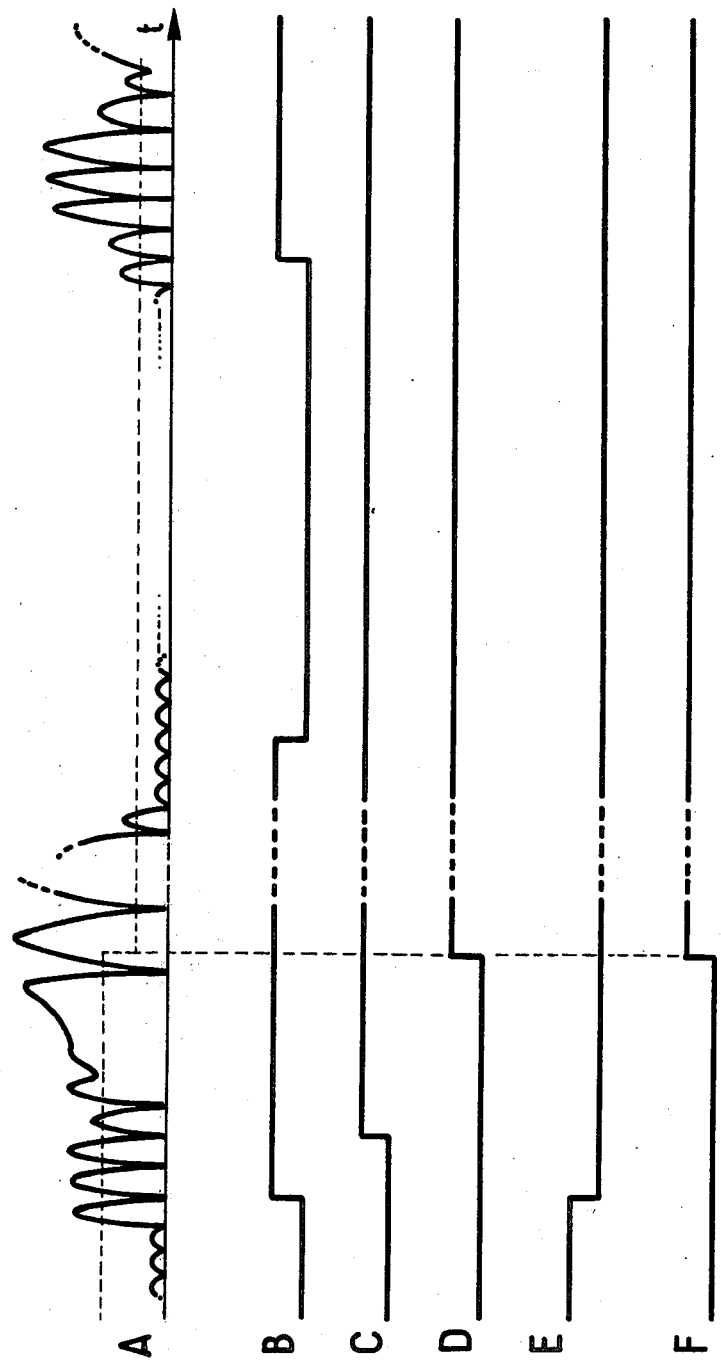

HALF ECHO-SUPPRESSOR FOR A FOUR-WIRE TELEPHONE LINE

The present invention relates to a half echo-suppressor for a terminal of a four-wire telephone line.

In numerous communication systems, it is usual to interconnect local two-wire lines in a terminal with four-wire lines via a hybrid circuit. The four-wire system provides separate one-way channels for sending and for receiving the signals exchanged between terminals. Since the hybrid circuit is never ideal, a part of the transmitted signal is returned to the terminal which sent it and is perceived as an echo, if the loop delay is not negligible. This delay can be due to the distance between the two subscribers who are in conversation; it can also be due to a delay line which is used in modern networks to enable the speech signal to be processed with a view to companding the data and to improving line utilization.

In such a case, it is known to insert a half-echo suppressor at each terminal; these supressors observe the state of activity of both channels and insert a blocking element in the send channel when the near subscriber is not speaking and an attenuator in the receive channel when the near subscriber is speaking. Such echo suppressors also enable simultaneous two-way conversation between the near subscriber and the far subscriber. In a PCM telephone network, such echo suppressors are designed using digital technology and are time shared between a large number of telephone channels.

U.S. Pat. No. 3,985,979 (British Pat. No. 1,477,413) discloses a digital half-echo suppressor whose speech detector on the send channel has two modes of operation: the first consists in delivering a speech presence signal from criteria relating to amplitude and change of sign in the send channel; the second consists in delivering a speech presence signal from a comparison between the amplitude in the send channel and the amplitude in the receive channel; the second mode is used when the receive channel is active. As soon as the signal detected in the send channel is stronger than the signal detected in the receive channel, it cannot be the echo but is a speech signal of the near subscriber.

Accidental tripping of the transmitted speech detector has very detrimental consequences if it occurs while the far subscriber is speaking. Indeed, such tripping inhibits the blocking element on the send channel. The noise which tripped the detector is then transmitted as well as a fragment of echo. Further and above all, the attenuator is inserted in the receive channel for a relatively long time; this causes a low level of reception for a long time; this time must be long (about 600 milliseconds) to allow the attenuation of the near subscriber's echo when the near subscriber stops speaking.

To limit the risk of such accidental tripping, it is necessary for the transmitted speech detector to be relatively slow, but the disadvantage of this is that it substantially cuts off the first syllable of the near subscriber's speech.

To solve this problem, the invention aims to modify the transmitted speech detector to fulfill several functions simultaneously:

1. Firstly, inhibition of the blocking element must be controlled rapidly in the case of speech by the near subscriber and the hold time of this inhibition must be short 2. The blocking element must still be inhibited after the near subscriber has stopped speaking for a hold time which spans the interval between two syllables; in this case, the beginning of inhibition must be delayed to avoid the risk of accidental tripping.

3. To control the attenuator on the receiving channel, detection must be slow and the hold time must be relatively long.

U.S. Pat. No. 3,825,694 (British Pat. No. 1,409,917) describes a speech detector for a telephone channel concentrator (i.e. speech interpolator) which assigns an index to each sample, these indices being accumulated for the successive samples. Noise gives a negative index, while signals with a greater amplitude give positive indices. When the content of an accumulator reaches an upper limit, the channel is considered as active and when this content falls back to zero, the channel is considered as inactive.

When it is required to satisfy the three above-mentioned criteria by this technology, three speech detectors are needed, and each must apply a different starting threshold criterion and a different hold time.

The invention aims to obtain the same result without however trebling the costs of the speech detectors.

The invention provides a half echo-suppressor for a terminal of a four-wire telephone line, said suppressor comprising a send channel in which a controlled blocking element is inserted and a receive channel in which a controlled attenuator is inserted, the blocking element and the attenuator being controlled by speech signal detectors on both channels so that the send channel is blocked when the received speech detector detects speech signals on the receive channel and that the receive channel is attenuated while the transmitted speech detector detects speech signals on the send channel, the send channel detector comprising a digital accumulator which receives indices which describe amplitude and/or frequency characteristics of the send signal, a negative index being assigned to noise, the send channel being considered as active when the content of the accumulator reaches an upper limit and being considered as inactive when this content reaches a lower limit, wherein at least one digital threshold comparator is provided and to receive the content of the accumulator and to deliver a send channel unblocking order to said blocking element when the content of the accumulator, while increasing, exceeds a first threshold situated between the two limits, this order disappearing when the content of the accumulator, while decreasing, falls below a second threshold lower than the first.

therefore only one speech detector with an index accumulator needs to be provided and the content of the accumulator is observed in relation to several thresholds and not only in relation to the two limits of the accumulator.

In an advantageous embodiment of the invention, the half echosuppressor has two threshold comparators, their thresholds being different, the comparator having the lower thresholds being directly applied to controlling unblocking, while the comparator having the higher thresholds is applied to controlling unblocking via a hold circuit.

Advantageously, the second threshold of at least one of the comparators is identical to the lower limit of the accumulator.

An embodiment of the invention will be described in greater detail hereinbelow with reference to the accompanying drawings in which:

FIG. 2 shows wareform diagrams relating to the half-echo suppressor in accordance with the invention;

Figure 1:
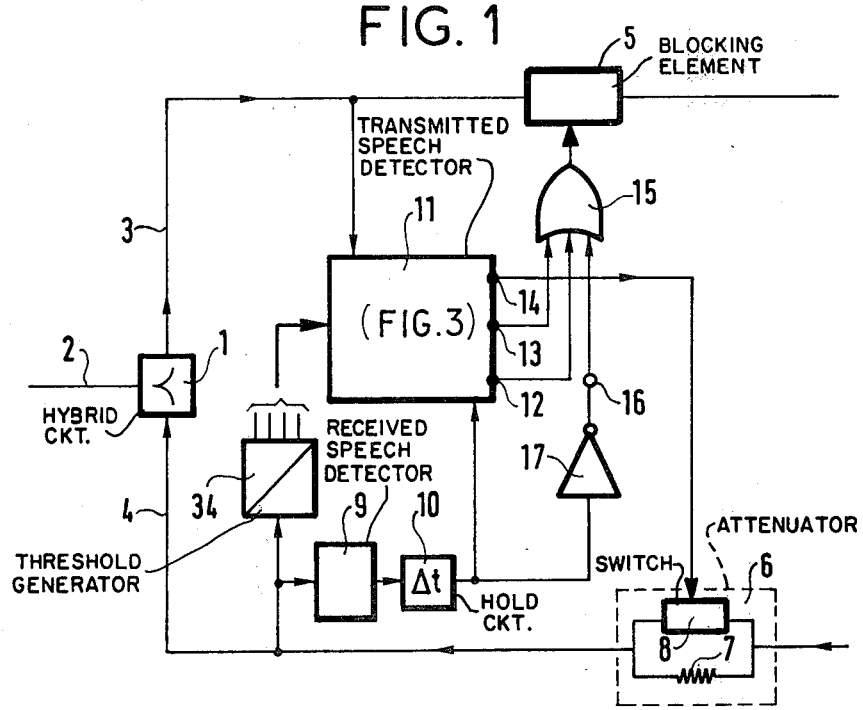
FIG. 1 illustrates schematically a half-echo suppressor in which the invention can be used.

FIG. 1, which illustrates schematically a half-echo suppressor in accordance with the invention, shows a hybrid circuit 1 which transforms a two-wire subscriber line 2 into a four-wire line with one send channel 3 and one receive channel 4. In the send channel, there is a blocking element 5 which is here schematically represented by a switch but which, of course, can be constituted by modern electronic switching means.

An attenuator 6 which can include an attenuation resistor 7 and, in parallel therewith, a switch 8, is inserted in the receiving channel 4. When this switch short-circuits the resistor 7, there is not attenuation and the attenuator 6 is said to be out of service. When the switch is open, the attenuator is considered to be active or in service.

To control the blocking element 5, a received speech detector 9 is provided. It is a simple peak detector and is followed by a hold circuit 10, for example a 30-millisecond hold circuit.

The attenuator 6 is controlled by a transmitted speech detector 11 which will be described hereinafter in greater detail and which also assists in controlling the blocking element. The speech detector 11 receives the signal on the send channel and a threshold which is generated in a threshold generator 34 as a function of the signal on the receive channel.

The expression "signal" in the context of the send channel or of the receive channel includes in particular the digital representation of the signal in the form of digital values of the various samples. The transmitted speech detector 11 has three outputs 12, 13 and 14 of which the first two are applied to an OR gate 15 and control the blocking element 5, while the third 14 directly controls the switch 8 of the attenuator 6.

FIG. 2 shows, below a representative signal in the send channel (diagram A) the response which the speech detector 11 delivers at its three outputs and the states of the blocking element and of the attenuator in the case where the far subscriber is speaking (receive channel in action). Wareform A shows that the near subscriber is speaking initially, then he stops speaking between two syllables and begins again.

Waveform B shows the binary signal available at the output 12 of the speech detector. It is seen that it follows the beginning and the end of the near subscriber's speech signals with a negligible delay. It also observes the pause between two syllables. Via the OR gate 15, the output 12 puts the blocking element out of service as soon as and as long as it observes speech on the channel.

Waveform C shows the signal available at the output 13 of the detector. The signal responds with a slightly greater delay (and hence with greater security) to the presence of speech signals on the send channel and it is held after the speech signals have disappeared for a hang over time which can span the gap between two syllables and which can be 50 milliseconds, for example.

The third output 14 of the detector 11 delivers the signal represented in waveform D in FIG. 2. Its initial delay is even longer than that of the signal in waveform C and its holding time is appreciably longer, e.g. 600 milliseconds, to allow the near subscriber's echo to be attenuated in the case of a very long distance call, for example by satellite.

As has been stated, the receive channel is considered as active during the whole time represented in FIG. 2. A third input 16 of the OR gate 15 is set to zero by an inverter 17, which receives data concerning the activity of the receive channel. As soon as the receiver channel becomes free, the inverter 17 applies a data signal 1 to the gate 15 and unblocks the send channel (=closing of the switch 5).

Waveform E shows the state of the blocking element 5 for the example of the signal in waveform A providing that the receive channel is active. It is seen that the switch opens at the beginning (blocking element in service) and that it is closed by the signal on the output 12 as soon as speech is observed on the send channel. The switch remains closed due to the signal on the the output 13 during the intervals between two sillables.

Waveform F indicates the state of the attenuator which is initially out of service (switch 8 closed) and which is switched by the signal at the output 14 when the near subscriber is actually speaking.

It should be observed that the threshold applied by the generator 34 to the speech detector 11 changes as soon as the switch 8 opens (output 14-waveform D). When the attenuator is put into service, it reduces this threshold, which threshold is represented by dotted lines in waveform A.

It is easy to imagine the action of the transmitted speech detector in the case of an accidental pulse on the send channel. If such a pulse, which does not correspond to speech, lasts less than the reaction time of the output 12, there is absolutely no influence on the blocking element or on the attenuator. If, in contrast, this pulse exceeds a given time, for example 2 milliseconds, a short pulse, of 4 milliseconds for example, is observed on the output 12 and a corresponding change of the blocking element is also observed during the same time. The other two outputs 13 and 14 of the echo suppressor do not change, since their initial reaction is much longer than 2 milliseconds. Therefore the blocking element allows the echo to pass only during a very short time; this is not a hindrance. Further, there is no reduction in the near subscriber's level of reception since the attenuator remains out of service.

Figure 3:
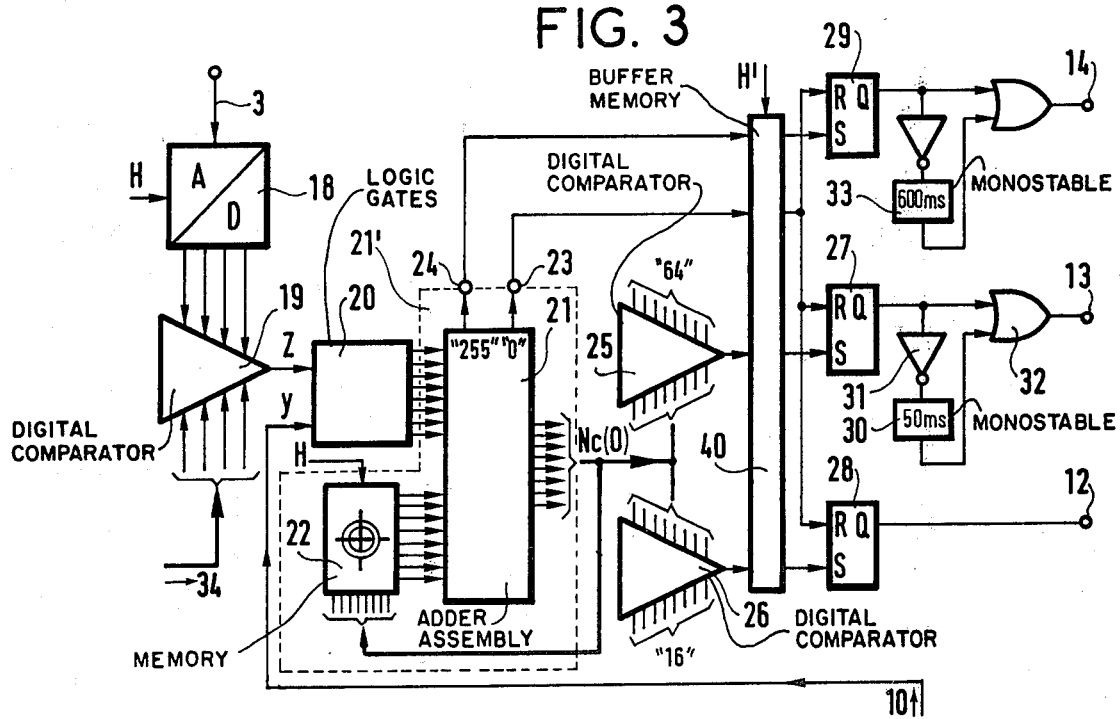
FIG. 3 shows the speech detector which forms a part of the half-echo suppressor in accordance with the invention.

For a more complete understanding of the invention, reference is now made to FIG. 3, which shows a particular embodiment of the speech detector 11.

The speech detector such as shown in FIG. 3 uses the technology described U.S. Pat. No. 3,825,694. The idea of this technology is to give each sample of the signal (sampled every 125 microseconds) a positive index if the sample is greater than a threshold or a negative index in the contrary case and to add the indices of the successive samples to obtain a "cumulative index". It is decided that the circuit is active as soon as the cumulative index reaches an upper limit value and that it remains active until the cumulative index has returned to zero. In the present example, a positive index $+1$ or $+4$ according to whether the receive channel is inactive or active is assigned to the samples whose absolute value is greater than a threshold; if the absolute value of the sample is smaller than this threshold, the index $(-1)$ is assigned to it whether the receive channel is inactive or active. These figures for the indices are given only by way of example. It is quite clear that the choice of indices and of the values of the limits influence the speed of the detector.

It is proposed to use the detector in accordance with said patent in combination with comparators with different thresholds so as to produce, so to speak, several detectors with the same signal from the same accumulator, each detector having a different characteristic.

The slowest detector (output 14) is produced in accordance with said French patent. To obtain a slow operation time, the indices are small and the limit of the cumulative index high. The other detectors are produced by adding comparators whose thresholds are fixed in accordance with the required characteristics. In the example chosen, the lower thresholds of all the comparators coincide with the lower zero limit of the accumulator. In FIG. 3, it is seen that the signal of the send channel 3 is transformed into a digital signal in a sampler-converter 18 driven by a sampling clock signal H and which codes the absolute value of the amplitude of the samples on four bits. A ditial comparator 19 compares this value with the value of a threshold supplied by the threshold generator 34 and also coded on four bits, to deliver a binary signal Z which, by its level "1" or "0", indicates whether the value of the amplitude is greater than or less than the threshold.

An index N is assigned to each sample in the form of an eight-bit code with bits referenced a1 to a8 according to the table hereinbelow.

|  | a8 | a7 | a6 | a5 | a4 | a3 | a2 | a1 |
|---|---|---|---|---|---|---|---|---|
| index +1 | 0 | 0 | 0 | 0 | 0 | 0 | 0 | 1 |
| index +4 | 0 | 0 | 0 | 0 | 0 | 1 | 0 | 0 |
| index −1 | 1 | 1 | 1 | 1 | 1 | 1 | 1 | 1 |

This function is fulfilled by a set of logic gates 20 which receive firstly the signal Z and secondly the signal Y delivered by the received speech detector 9 via the hold circuit 10 (FIG. 1); for example Y is at level "1" to indicate activity of the receive channel and at level "0" to indicate inactivity of the receive channel. In these conditions:

the index $+1$ is given when $\overline{Y}.Z=1$
the index $+4$ is given when $Y.Z=1$
the index $-1$ is given when $\overline{Z}=1$
and the bits a8 to a1 of the index N are defined by:
$a8=a7=a6=a5=a4=a2=\overline{Z}$
$a3=\overline{Y}.Z$
$a1=\overline{Y}.Z$ The index N thus determined is applied to a digital accumulator 21' formed by an adder assembly 21 and by a memory 22. The adder assembly 21 receives the previously cumulated index NC (−1) from the memory 22, which is controlled by the clock signal H; it then delivers a cumulative index NC(o). This index NC(o) is obtained, as a general rule, by adding the preceding cumulative index NC(−1) to the instantaneous index N. If the result of this addition exceeds the upper limit, for example the value 255, the upper limit is delivered by the assembly 21. Likewise, the lower zero limit is delivered by the assembly 21 if the accumulation gives a negative value. The assembly 21 also delivers two logic signals which indicate respectively the presence of the lower limit (0) and of the upper limit (255) to the two outputs 23 and 24 of the accumulator 21'.

An embodiment of the assembly 21 will be described hereinbelow.

The cumulative value NC (0) of the accumulator 21' is applied to two digital comparators 25 and 26 respectively, which deliver two binary signals according to whether the value of contents of the accumulator 21' is greater than or less than the respective comparison value. Each of these binary signals trips a respective bistable 27 or 28 which is reset to zero by the signal available at the output 24 of the accumulator and it is reset to zero by the signal available at the output 23 of the accumulator 21'. These bistables are therefore reset to zero as soon as the content of the accumulator reaches the value zero. Another bistable 29 of the same type is tripped by the signal available at the output 23. As shown in the figure, the signals at the outputs 23 and 24 and the output signals of the comparators 25 and 26 are used for controlling the bistables 27, 28 and 29 via a buffer memory 40 driven by a signal H'which is a delayed version of the sampling signal H.

The comparator 26 is considered as that of the lowest upper threshold for example fixed at the value "16". This threshold is therefore reached in the first instance and the output 12 of the bistable 28 acts as the fastest detector (see also FIG. 1).

The output of the bistable 27 is connected to the output 13 (see FIG. 1) via a 50-milisecond hold circuit. The hold circuit is constituted mainly by a monostable 30 which is tripped via an inverter 31 by the output of the bistable 27 and whose output is combined with the direct output of the bistable 27 in an OR gate 32 whose output constitutes the terminal 13. The comparator 25 which trips the bistable 27 has a threshold greater than the threshold of the comparator 26, for example fixed at the value "64". Therefore a slower speech detector with a 50-millisecond hold time is simulated.

The output 14 (see FIG. 1) simulates the slowest detector since the bistable 29 which is associated with it is tripped when the accumulator 21 reaches its upper limit and its hold circuit includes a 600-millisecond monostable 33 (longest hold time).

Figure 4:
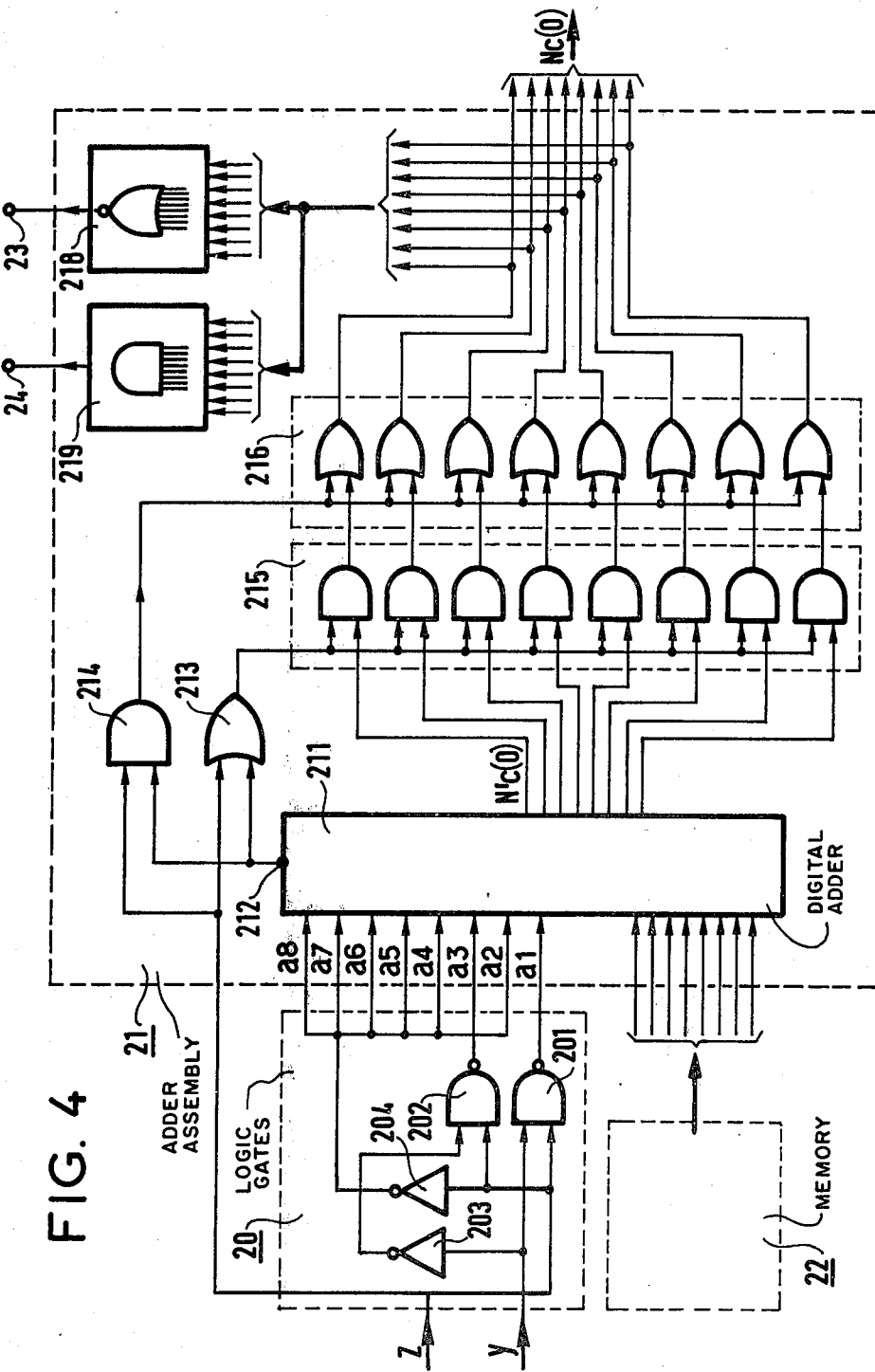
FIG. 4 gives a detailed illustration of some circuits of the detector of FIG. 3.

By way of example, FIG. 4 shows in detail a particular embodiment of the set of gates 20 and of the adder assembly 21 in FIG. 3. In this particular embodiment, the adder assembly 21 receives the output signal 2 of the comparator 19.

The assembly 20 which determines the bits a8 to a1 of the index N comprises a first NAND gate 201 which receives firstly the signal Z and secondly the signal Y to deliver the bit a1. A second NAND gate 202 receives firstly the signal Z and secondly the signal Y via an inverter 203 to deliver the bit a3. The bits a8, a7, a6, a5, a4 and a2 are obtained by simple inversion of the signal Z in an inverter 204.

The adder assembly 21, which determines the cumulative index NC (o) comprises a digital adder 211 which receives the eight bits of the index N from the assembly 20 and the eight bits of the preceding cumulative index NC (−1) from the memory 22 to add them together. The result of the addition, referred to as the index N'C (o), is delivered on eight bits by the adder 211; the adder also delivers the carry bit of the addition on an output 212. The carry bit is applied to an OR gate 213 which also receives the signal Z and to an AND gate 214 which likewise also receives the signal Z.

The output signal of the OR gate 213 controls eight AND gates which form an assembly 215; these eight gates receive the eight bits of the indices N'C (o) respectively. The output signal of the AND gate 214 is applied to eight OR gates which form an assembly 216; these eight OR gates are also connected to the outputs of the eight AND gates of the assembly 215 respectively. The eight bits of the index NC (o) delivered by the assembly 21 are collected at the output of the eight OR gates of the assembly 216 respectively.

Inside the assembly 21, the eight bits of the index NC (o) are applied to two coincidence detection circuits 218 and 219. The circuit 218, symbolized by a NOR gate, detects the coincidence with the value O; the circuit 219, symbolized by an AND gate, detects the coincidence with the value 255. The respective output signals of these coincidence detection circuits are applied at the outputs 23 and 24 of the accumulator 21' (FIG. 3) respectively.

The operation of the adder assembly 21 is described hereinbelow. Several cases are to be considered.

The signal Z is at level "1" (i.e. the index N is positive if the carry of the adder is zero; this means that the sum N+NC (−1) has a value which lies between 0 and 255; this sum is then correctly represented by the eight bits of N'C (o). In this case, the output signal of the OR gate 213 is at level "1" while the output signal of the AND gate 214 is at "0": the index NC (o) is equal to the index N'C (o). The signal at the output 23 as well as the signal at the output 24 are both at level "0" except if the index NC (o) is equal to 0, in which case the signal applied at the output 23 is at level "1" or if this index is equal to 255, in which case the signal applied at the output 24 is at level "1".

If the carry over of the adder is equal to 1, this means that the sum N+NC (−1) exceeds the value 255. In this case, the respective output signals 213 and 214 are at level "1"; the index NC (o) is equal to 255 since its eight bits are then all 1's; the signal applied at the output 24 is at level "1" and that the output 23 is at the level "0".

The signal Z is at level "0" (i.e. the index N is negative and is represented according to the previous table by its twos complement.

If the carry over of the adder is zero, this means that the sum N+NC (−1) has a negative value. In this case, the respective output signals of the gates 213 and 214 are at level "0"; this forces all the bits of the index NC (o) to level 0; the signal applied at the output 24 is at level "0" and that applied at the output 23 is at level "1".

If the carry of the adder is 1, this means that the value of the sum N+NC (−1) lies between 0 and 255; the sum is then correctly represented by the eight bits of N'C (o). In this case, the output signal of the gate 213 is at level "1" and that of the gate 214 is at level "0": the index NC (o) and the signals applied at the outputs 23 and 24 are at level "0"except if one or the other of the two coincidence detection circuits detects a coincidence; the signal applied at the correcponding output 23 or 24 is then at level "1".

There has been described an embodiment of the invention for one telephone channel. Of course, for a time-sharing use with several other telephone channels, extra memories must be provided to memorize temporarily the data concerning the chanels which are not being processed at a given instant.

The invention is not limited to the embodiment described hereinabove as far as concerns the values of the thresholds or of the instantaneous indices. The embodiment can also be simplified by using the same instantaneous index in the case of both an active and an inactive receive channel. Further, in both cases, the use of two different indices increases the number of cumulative indices more or less. Therefore the risk of accidentally tripping the transmitted speech detectors (especially the output 12) is reduced without great expense. Further, when the receive channel is inactive, it is not necessary to detect as rapidly as when the receive channel is active. Therefore when the receive channel is inactive there is no disadvantage in reducing slightly the response time of the transmitted speed detector.

I claim:

1. A half echo-suppressor for a terminal of a fourwire telephone circuit, said suppressor comprising:
 a send channel including a controlled transmission blocking element;
 a receive channel including a controlled transmission attenuator; and
 first and second speech detectors, respectively connected to said send and receive channels, for directing said transmission blocking element to block said send channel when said second speech detector detects speech on said receive channel and for directing said attenuator to attenuate said receive channel when said first speech detector detects speech on said send channel, wherein said first speech detector comprises:
 means, connected to said send channel, for periodically assigning an index to said send signal, the resulting indices being representative of the amplitude characteristics of the speech signal present on said send channel, said assigning means assigning a negative index to noise;
 a digital accumulator, connected to said assigning means, for accumulating said indices, said send channel being considered active when the contents of said accumulator reaches an upper limit, and inactive when the contents of said accumulator reaches a lower limit; and
 at least one digital comparator connected to said accumulator, for generating a send channel unblocking command for said blocking element when the contents of said accumulator, when increasing, exceeds a first threshold intermediate said upper and lower limits, said unblocking command being discontinued when the content of said accumulator, while decreasing, falls below a second threshold lower than the first.

2. The echo-suppressor according to claim 1, further comprising:
 means, upstream of said index assigning means, for sampling said send channel and for generating a digital signal representative of each sample, said index assigning means assigning an index to each sample generated by said sampling means.

3. The echo-suppressor according to either claim 1 or claim 2, further comprising:
 a hold circuit, said at least one digital comparator comprising first and second digital comparators, each having a first and a second threshold, the output of said second comparator comprising directly said send channel unblocking command, the output of said first comparator being connected to said hold circuit, thence comprising the means used to discontinue said channel unblocking command.

4. The echo-suppressor according to claim 3 wherein the first threshold of the first comparator is greater than the first threshold of the second comparator.

* * * * *